US012616258B2

(12) United States Patent
Henderson et al.

(10) Patent No.: US 12,616,258 B2
(45) Date of Patent: May 5, 2026

(54) RESPIRATOR TAB

(71) Applicant: 3M INNOVATIVE PROPERTIES COMPANY, St. Paul, MN (US)

(72) Inventors: Christopher P. Henderson, High Shincliffe (GB); Reyad A. Abdulqader, Stockton-On-Tees (GB); James J. May, Kenilworth (GB); Mark A. J. Fernandes, Leamington Spa (GB); David N. Boyce, West Bridgford (GB)

(73) Assignee: 3M Innovative Properties Company, St. Paul, MN (US)

( * ) Notice: Subject to any disclaimer, the term of this patent is extended or adjusted under 35 U.S.C. 154(b) by 839 days.

(21) Appl. No.: 15/528,798

(22) PCT Filed: Dec. 3, 2015

(86) PCT No.: PCT/US2015/063577
§ 371 (c)(1),
(2) Date: May 23, 2017

(87) PCT Pub. No.: WO2016/090067
PCT Pub. Date: Jun. 9, 2016

(65) Prior Publication Data

US 2017/0311661 A1 Nov. 2, 2017

(30) Foreign Application Priority Data

Dec. 4, 2014 (GB) ..................................... 1421617

(51) Int. Cl.
*A41D 13/11* (2006.01)
*A62B 18/10* (2006.01)
*A62B 23/02* (2006.01)

(52) U.S. Cl.
CPC .......... *A41D 13/1115* (2013.01); *A62B 18/10* (2013.01); *A62B 23/025* (2013.01); *A41D 2400/44* (2013.01)

(58) Field of Classification Search
CPC . A41D 13/11; A41D 13/1107; A41D 13/1115; A41D 13/1123; A41D 13/113;
(Continued)

(56) References Cited

U.S. PATENT DOCUMENTS

| | | | |
|---|---|---|---|
| 715,052 | A | 12/1902 | Goodwin |
| 1,440,358 | A | 12/1922 | Whetstone |

(Continued)

FOREIGN PATENT DOCUMENTS

| | | |
|---|---|---|
| CA | 2213332 | 9/1996 |
| CN | 1220901 | 6/1999 |

(Continued)

OTHER PUBLICATIONS

External definition. Merriam Webster Online Dictionary. definition 2a. https://www.merriam-webster.com/dictionary/external (Year: 2020).*

(Continued)

*Primary Examiner* — Alireza Nia
*Assistant Examiner* — Michael Milo

(57) ABSTRACT

A personal respiratory protection device comprising an upper panel (18), a central panel (16), and a lower panel (20), the central panel (16) being separated from each of the upper and lower panels (18) by a first and second fold (36), seam, weld (76) or bond, respectively, such that device is capable of being folded flat for storage along the first and second fold (36), seam, weld (76) or bond and opened to form a cup-shaped air chamber over the nose and mouth of the wearer when in use, wherein the lower panel (20) has a graspable tab (32) attached to an interior portion of an
(Continued)

external surface of the lower panel (20), the tab (32) being graspable in use to open the device.

10 Claims, 8 Drawing Sheets

(58) Field of Classification Search
CPC ............ A41D 13/1138; A41D 13/1146; A41D 13/1161; A41D 13/1169; A41D 13/1192; A62B 18/00; A62B 18/02; A62B 18/025; A61F 13/12; A61F 13/122; A61F 13/126; A61F 9/02; A61F 9/026; A61F 9/027; A61F 9/028; A61F 9/029
USPC .......................................................... 128/863
See application file for complete search history.

(56) References Cited

U.S. PATENT DOCUMENTS

| | | | | |
|---|---|---|---|---|
| D72,020 | S | | 2/1927 | Labram |
| 1,628,090 | A | | 5/1927 | Weiss |
| 1,867,478 | A | | 7/1932 | Hermann |
| 1,987,922 | A | | 1/1935 | Blatt |
| 2,012,505 | A | | 8/1935 | Goldsmith |
| 2,029,947 | A | | 2/1936 | Schmitt |
| 2,072,516 | A | | 3/1937 | Ferenci |
| D109,390 | S | | 4/1938 | Bux |
| D112,562 | S | | 12/1938 | Huizing |
| 2,230,770 | A | | 2/1941 | Almelo |
| 2,265,529 | A | | 12/1941 | Kemp |
| 2,281,744 | A | | 5/1942 | Brunner |
| 2,290,885 | A | | 7/1942 | Lehmberg |
| 2,378,929 | A | | 6/1945 | Joyce |
| 2,507,447 | A | | 5/1950 | Joie |
| 2,565,124 | A | | 8/1951 | Durborow |
| 2,634,725 | A | | 4/1953 | Presti |
| 2,752,916 | A | | 7/1956 | Haliczer |
| RE24,549 | E | | 10/1958 | Haliczer |
| 2,895,472 | A | | 7/1959 | Matheson |
| 3,014,479 | A | | 12/1961 | Matheson |
| 3,038,470 | A | | 6/1962 | Campbell |
| 3,059,637 | A | | 10/1962 | Senne |
| 3,082,767 | A | | 3/1963 | Matheson |
| 3,220,409 | A | | 11/1965 | Liloia |
| 3,288,138 | A | | 11/1966 | Sachs |
| 3,308,816 | A | | 3/1967 | Franklin |
| 3,557,265 | A | | 1/1971 | Chisholm |
| 3,603,315 | A | | 9/1971 | Becker, III |
| 3,652,895 | A | | 3/1972 | Tsuneta |
| 3,736,928 | A | | 6/1973 | Andersson |
| 3,752,157 | A | | 8/1973 | Malmin |
| 3,768,100 | A | | 10/1973 | Colman |
| 3,834,384 | A | | 9/1974 | Raines |
| 3,855,046 | A | | 12/1974 | Hansen |
| 3,888,246 | A | | 6/1975 | Lauer |
| 3,890,966 | A | | 6/1975 | Aspelin |
| 3,971,369 | A | | 7/1976 | Aspelin |
| 3,971,373 | A | | 7/1976 | Braun |
| 3,974,829 | A | | 8/1976 | Tate, Jr. |
| 3,983,900 | A | | 10/1976 | Airhart |
| 3,985,132 | A | | 10/1976 | Boyce |
| 3,994,319 | A | | 11/1976 | Airhart |
| 4,013,816 | A | | 3/1977 | Sabee |
| 4,037,593 | A | | 7/1977 | Tate, Jr. |
| 4,077,404 | A | | 3/1978 | Elam |
| 4,090,510 | A | | 5/1978 | Segersten |
| 4,100,324 | A | | 7/1978 | Anderson |
| D249,279 | S | | 9/1978 | Backlund |
| 4,118,531 | A | | 10/1978 | Hauser |
| 4,215,682 | A | | 8/1980 | Kubik |
| 4,248,220 | A | | 2/1981 | White |
| 4,300,240 | A | | 11/1981 | Edwards |
| 4,300,549 | A | | 11/1981 | Parker |
| 4,306,584 | A | | 12/1981 | Schlobohm |
| 4,319,567 | A | | 3/1982 | Magidson |
| 4,375,718 | A | | 3/1983 | Wadsworth |
| RE31,285 | E | | 6/1983 | van Turnhout |
| D270,110 | S | | 8/1983 | Moore |
| 4,417,575 | A | | 11/1983 | Hilton |
| 4,419,993 | A | | 12/1983 | Petersen |
| 4,419,994 | A | | 12/1983 | Hilton |
| 4,429,001 | A | | 1/1984 | Kolpin |
| 4,454,881 | A | | 6/1984 | Huber |
| 4,520,509 | A | | 6/1985 | Ward |
| 4,536,440 | A | | 8/1985 | Berg |
| 4,588,537 | A | | 5/1986 | Klaase |
| 4,592,815 | A | | 6/1986 | Nakao |
| 4,628,927 | A | | 12/1986 | Ward |
| 4,630,604 | A | | 12/1986 | Montesi |
| D287,649 | S | | 1/1987 | Zdrok |
| 4,635,628 | A | | 1/1987 | Hubbard |
| 4,641,645 | A | | 2/1987 | Tayebi |
| 4,643,182 | A | | 2/1987 | Klein |
| 4,688,566 | A | | 8/1987 | Boyce |
| 4,719,911 | A | | 1/1988 | Carrico |
| 4,790,306 | A | | 12/1988 | Braun |
| 4,798,850 | A | | 1/1989 | Brown |
| 4,807,619 | A | | 2/1989 | Dyrud |
| 4,827,924 | A | | 5/1989 | Japauntich |
| 4,850,347 | A | | 7/1989 | Skov |
| 4,867,148 | A | | 9/1989 | Gomez |
| 4,873,972 | A | | 10/1989 | Magidson |
| 4,930,161 | A | | 6/1990 | Cohen |
| 4,934,362 | A | | 6/1990 | Braun |
| 4,941,467 | A | | 7/1990 | Takata |
| 4,941,470 | A | | 7/1990 | Hubbard |
| 4,951,664 | A | | 8/1990 | Niemeyer |
| 4,971,052 | A | | 11/1990 | Edwards |
| 4,974,586 | A | | 12/1990 | Wandel |
| 4,981,134 | A | | 1/1991 | Courtney |
| 5,025,506 | A | | 6/1991 | Huang |
| 5,035,006 | A | | 7/1991 | Hetz |
| 5,035,239 | A | | 7/1991 | Edwards |
| 5,062,421 | A | | 11/1991 | Burns |
| 5,099,897 | A | | 3/1992 | Curtin |
| 5,103,337 | A | | 4/1992 | Schrenk |
| D326,541 | S | | 5/1992 | McBrearty |
| D334,633 | S | | 4/1993 | Rudolph |
| 5,217,794 | A | | 6/1993 | Schrenk |
| 5,237,986 | A | | 8/1993 | Seppala |
| 5,285,816 | A | | 2/1994 | Herlihy |
| D347,298 | S | | 5/1994 | Japuntich |
| D347,299 | S | | 5/1994 | Bryant |
| 5,307,796 | A | | 5/1994 | Kronzer |
| 5,322,061 | A | | 6/1994 | Brunson |
| 5,325,892 | A | * | 7/1994 | Japuntich ............. A62B 18/084<br>137/855 |
| 5,355,910 | A | | 10/1994 | Gies |
| 5,360,659 | A | | 11/1994 | Arends |
| 5,394,568 | A | | 3/1995 | Brostrom |
| 5,419,318 | A | | 5/1995 | Tayebi |
| 5,446,925 | A | | 9/1995 | Baker |
| 5,464,010 | A | | 11/1995 | Byram |
| D366,697 | S | | 1/1996 | Drummond |
| 5,481,763 | A | | 1/1996 | Brostrom |
| 5,486,949 | A | | 1/1996 | Schrenk |
| 5,496,507 | A | | 3/1996 | Angadjivand |
| 5,505,197 | A | | 4/1996 | Scholey |
| 5,509,436 | A | | 4/1996 | Japuntich |
| 5,558,089 | A | | 9/1996 | Castiglione |
| 5,561,863 | A | | 10/1996 | Castiglione |
| D377,979 | S | | 2/1997 | Plaschko |
| 5,617,849 | A | | 4/1997 | Springett |
| 5,628,308 | A | | 5/1997 | Harges, Jr. |
| D380,545 | S | | 7/1997 | Nozaki |
| 5,656,368 | A | | 8/1997 | Braun |
| D384,151 | S | | 9/1997 | Raufman |
| D384,152 | S | | 9/1997 | Raufman |
| 5,673,690 | A | | 10/1997 | Tayebi |
| 5,682,879 | A | | 11/1997 | Bowers |
| 5,687,767 | A | | 11/1997 | Bowers |
| 5,699,791 | A | | 12/1997 | Sukiennik |
| 5,701,892 | A | | 12/1997 | Bledstein |

(56) References Cited

U.S. PATENT DOCUMENTS

| | | | | |
|---|---|---|---|---|
| 5,701,893 | A | 12/1997 | Kern | |
| D389,239 | S | 1/1998 | Scholey | |
| 5,704,063 | A | 1/1998 | Tilden | |
| 5,717,991 | A | 2/1998 | Nozaki | |
| 5,724,677 | A | 3/1998 | Bryant | |
| 5,724,964 | A | 3/1998 | Brunson | |
| 5,804,295 | A | 9/1998 | Braun | |
| 5,813,398 | A | 9/1998 | Baird | |
| 5,819,731 | A | 10/1998 | Dyrud | |
| 5,825,543 | A | 10/1998 | Ouderkirk | |
| 5,829,433 | A | 11/1998 | Shigematsu | |
| 5,865,172 | A | 2/1999 | Butler | |
| 5,865,196 | A | 2/1999 | Foote | |
| 5,882,774 | A | 3/1999 | Jonza | |
| 5,884,336 | A | 3/1999 | Stout | |
| 5,906,507 | A | 5/1999 | Howard | |
| 5,908,598 | A | 6/1999 | Rousseau | |
| 5,924,420 | A | 7/1999 | Reischel | |
| 5,927,280 | A | 7/1999 | Miyake | |
| D412,573 | S | 8/1999 | Castiglione | |
| D413,166 | S | 8/1999 | Snow | |
| D416,323 | S | 11/1999 | Henderson | |
| D420,769 | S | 2/2000 | White | |
| 6,026,511 | A | 2/2000 | Baumann | |
| 6,041,782 | A | 3/2000 | Angadjivand | |
| 6,045,894 | A | 4/2000 | Jonza | |
| 6,047,698 | A | 4/2000 | Magidson | |
| D424,688 | S | 5/2000 | Bryant | |
| 6,062,220 | A | 5/2000 | Whitaker | |
| 6,062,221 | A | 5/2000 | Brostrom | |
| 6,095,143 | A | 8/2000 | Dyrud | |
| 6,096,247 | A | 8/2000 | Ulsh | |
| 6,098,201 | A | 8/2000 | Boros, Sr. | |
| 6,102,039 | A | 8/2000 | Springett | |
| 6,102,040 | A | 8/2000 | Tayebi | |
| 6,116,236 | A | 9/2000 | Wyss | |
| 6,119,692 | A | 9/2000 | Byram | |
| 6,123,077 | A | 9/2000 | Bostock | |
| D431,647 | S | 10/2000 | Henderson | |
| 6,125,849 | A | 10/2000 | Williams | |
| 6,140,551 | A | 10/2000 | Niemeyer | |
| 6,148,817 | A | 11/2000 | Bryant | |
| D434,879 | S | 12/2000 | Cole | |
| 6,157,490 | A | 12/2000 | Wheatley | |
| 6,173,712 | B1 | 1/2001 | Brunson | |
| 6,179,948 | B1 | 1/2001 | Merrill | |
| 6,186,140 | B1 | 2/2001 | Hoague | |
| 6,207,260 | B1 | 3/2001 | Wheatley | |
| 6,210,266 | B1 | 4/2001 | Barton | |
| 6,234,171 | B1 | 5/2001 | Springett | |
| D443,927 | S | 6/2001 | Chen | |
| 6,257,235 | B1 | 7/2001 | Bowen | |
| 6,277,178 | B1 | 8/2001 | Holmquist-Brown | |
| D448,472 | S | 9/2001 | Chen | |
| D449,377 | S | 10/2001 | Henderson | |
| 6,332,465 | B1 | 12/2001 | Xue | |
| 6,336,459 | B1 * | 1/2002 | Miyake .............. | A41D 13/1123<br>128/206.19 |
| 6,352,761 | B1 | 3/2002 | Hebrink | |
| 6,354,296 | B1 | 3/2002 | Baumann | |
| 6,375,886 | B1 | 4/2002 | Angadjivand | |
| 6,391,429 | B1 | 5/2002 | Senkus | |
| 6,394,090 | B1 | 5/2002 | Chen | |
| D458,364 | S | 6/2002 | Curran | |
| D459,471 | S | 6/2002 | Curran | |
| 6,397,458 | B1 | 6/2002 | Jones | |
| 6,398,847 | B1 | 6/2002 | Jones | |
| 6,406,657 | B1 | 6/2002 | Eitzman | |
| 6,409,806 | B1 | 6/2002 | Jones | |
| 6,454,986 | B1 | 9/2002 | Eitzman | |
| D464,725 | S | 10/2002 | Petherbridge | |
| 6,457,473 | B1 | 10/2002 | Brostrom | |
| 6,460,539 | B1 | 10/2002 | Japuntich | |
| 6,484,722 | B2 | 11/2002 | Bostock | |
| 6,492,286 | B1 | 12/2002 | Berrigan | |
| RE37,974 | E | 2/2003 | Bowers | |
| 6,520,181 | B2 | 2/2003 | Baumann | |
| 6,530,374 | B1 | 3/2003 | Ferraro | |
| 6,531,230 | B1 | 3/2003 | Weber | |
| 6,536,434 | B1 | 3/2003 | Bostock | |
| 6,561,257 | B2 | 5/2003 | Huang | |
| 6,568,392 | B1 | 5/2003 | Bostock | |
| 6,584,976 | B2 | 7/2003 | Japuntich | |
| 6,593,980 | B2 | 7/2003 | Lee | |
| 6,604,524 | B1 | 8/2003 | Curran | |
| 6,705,317 | B2 | 3/2004 | Castiglione | |
| 6,715,489 | B2 | 4/2004 | Bostock | |
| 6,722,366 | B2 | 4/2004 | Bostock | |
| 6,729,332 | B1 | 5/2004 | Castiglione | |
| 6,743,464 | B1 | 6/2004 | Insley | |
| 6,754,909 | B1 | 6/2004 | Samelian | |
| 6,772,759 | B2 | 8/2004 | Lee | |
| 6,783,349 | B2 | 8/2004 | Neavin | |
| 6,783,574 | B1 | 8/2004 | Angadjivand | |
| 6,797,366 | B2 | 9/2004 | Hanson | |
| 6,823,868 | B1 | 11/2004 | Begum | |
| 6,824,718 | B2 | 11/2004 | Eitzman | |
| 6,827,764 | B2 | 12/2004 | Springett | |
| 6,843,248 | B2 | 1/2005 | Japuntich | |
| 6,854,463 | B2 | 2/2005 | Japuntich | |
| 6,857,428 | B2 | 2/2005 | Thornton | |
| 6,883,518 | B2 | 4/2005 | Mittelstadt | |
| 6,886,563 | B2 | 5/2005 | Bostock | |
| 6,923,182 | B2 | 8/2005 | Angadjivand | |
| 6,939,499 | B2 | 9/2005 | Merrill | |
| 6,945,249 | B2 | 9/2005 | Griesbach, III | |
| 6,948,499 | B2 | 9/2005 | Griesbach, III | |
| 6,959,709 | B2 | 11/2005 | Curran | |
| 6,978,782 | B2 | 12/2005 | Tayebi | |
| 6,988,500 | B1 * | 1/2006 | Cox ................... | A41D 13/1146<br>128/201.15 |
| 6,995,665 | B2 | 2/2006 | Appelt | |
| 7,007,695 | B2 | 3/2006 | Curran | |
| 7,013,895 | B2 | 3/2006 | Martin | |
| 7,019,905 | B2 | 3/2006 | Weber | |
| 7,028,689 | B2 | 4/2006 | Martin | |
| 7,036,507 | B2 | 5/2006 | Jensen | |
| 7,057,816 | B1 | 6/2006 | Allen | |
| 7,069,930 | B2 | 7/2006 | Bostock | |
| 7,069,931 | B2 | 7/2006 | Curran | |
| 7,117,868 | B1 | 10/2006 | Japuntich | |
| 7,131,442 | B1 | 11/2006 | Kronzer | |
| RE39,493 | E | 2/2007 | Yuschak | |
| 7,171,967 | B2 | 2/2007 | Brunell | |
| 7,178,528 | B2 | 2/2007 | Lau | |
| 7,185,653 | B2 | 3/2007 | Lee | |
| 7,188,622 | B2 | 3/2007 | Martin | |
| 7,195,015 | B2 | 3/2007 | Kuriyama | |
| D542,407 | S | 5/2007 | Stallard | |
| D546,942 | S | 7/2007 | Taylor | |
| 7,256,936 | B2 | 8/2007 | Hebrink | |
| 7,290,545 | B2 | 11/2007 | Kleman | |
| 7,302,951 | B2 | 12/2007 | Mittelstadt | |
| 7,311,104 | B2 | 12/2007 | Japuntich | |
| 7,316,558 | B2 | 1/2008 | Merrill | |
| D567,365 | S | 4/2008 | Brunell | |
| D567,937 | S | 4/2008 | Gerson | |
| D575,390 | S | 8/2008 | Scott | |
| 7,428,903 | B1 | 9/2008 | Japuntich | |
| 7,493,900 | B1 | 2/2009 | Japuntich | |
| 7,503,326 | B2 | 3/2009 | Martin | |
| 7,677,248 | B2 | 3/2010 | Gerson | |
| 7,686,018 | B2 | 3/2010 | Cerbini | |
| D613,850 | S | 4/2010 | Holmquist-Brown | |
| D620,104 | S | 7/2010 | Curran | |
| 7,766,015 | B2 | 8/2010 | Harold | |
| 7,836,886 | B2 | 11/2010 | McDonald | |
| 7,849,856 | B2 | 12/2010 | Mittelstadt | |
| 7,858,163 | B2 | 12/2010 | Angadjivand | |
| 7,905,973 | B2 | 3/2011 | Stelter | |
| D637,711 | S | 5/2011 | Facer | |
| 7,963,284 | B2 | 6/2011 | Thornton | |
| 8,029,723 | B2 | 10/2011 | Angadjivand | |
| 8,061,356 | B2 | 11/2011 | Bowen | |

(56) References Cited

U.S. PATENT DOCUMENTS

| | | | | |
|---|---|---|---|---|
| 8,066,006 | B2 | 11/2011 | Daugaard | |
| 8,074,660 | B2 | 12/2011 | Duffy | |
| 8,091,550 | B2 | 1/2012 | Stendorf | |
| 8,118,026 | B2 * | 2/2012 | Gebrewold | A62B 23/025 128/206.17 |
| RE43,289 | E | 4/2012 | Bowers | |
| D657,052 | S | 4/2012 | Amin | |
| D657,053 | S | 4/2012 | Amin | |
| 8,146,594 | B2 | 4/2012 | Bostock | |
| D659,821 | S | 5/2012 | Spoo | |
| 8,171,933 | B2 | 5/2012 | Xue | |
| 8,225,792 | B2 | 7/2012 | Kuriyama | |
| D665,536 | S | 8/2012 | Jenke | |
| 8,251,065 | B2 | 8/2012 | Kim | |
| 8,276,586 | B2 | 10/2012 | Hustveit | |
| 8,342,180 | B2 | 1/2013 | Martin | |
| 8,360,067 | B2 | 1/2013 | Duffy | |
| D676,527 | S | 2/2013 | Xue | |
| 8,365,771 | B2 | 2/2013 | Xue | |
| 8,375,950 | B2 | 2/2013 | Bostock | |
| 8,430,100 | B2 | 4/2013 | Reese | |
| D681,881 | S | 5/2013 | Pong | |
| 8,439,038 | B2 | 5/2013 | Steindorf | |
| 8,496,005 | B2 | 7/2013 | McDonald | |
| 8,512,434 | B2 | 8/2013 | Stelter | |
| 8,573,217 | B2 | 11/2013 | Todd | |
| 8,578,515 | B1 | 11/2013 | Petersen | |
| 8,580,182 | B2 | 11/2013 | Angadjivand | |
| 8,622,059 | B2 | 1/2014 | Kleman | |
| 8,640,704 | B2 | 2/2014 | Spoo | |
| 8,646,449 | B2 | 2/2014 | Bowsher | |
| 8,757,156 | B2 | 6/2014 | Martin | |
| D708,734 | S | 7/2014 | Curran | |
| 8,792,165 | B2 | 7/2014 | Merrill | |
| 8,839,815 | B2 | 9/2014 | Young | |
| 8,879,151 | B2 | 11/2014 | Merrill | |
| 8,910,663 | B2 | 12/2014 | Kern | |
| 8,975,011 | B2 | 3/2015 | Dunn | |
| 8,975,012 | B2 | 3/2015 | Dunn | |
| 8,982,462 | B2 | 3/2015 | Merrill | |
| D726,970 | S | 4/2015 | Martin | |
| 9,012,013 | B2 | 4/2015 | Duffy | |
| 9,019,607 | B2 | 4/2015 | Merrill | |
| D732,670 | S | 6/2015 | Dwyer | |
| 9,081,147 | B2 | 7/2015 | Merrill | |
| 9,097,858 | B2 | 8/2015 | Merrill | |
| 9,101,956 | B2 | 8/2015 | Merrill | |
| D737,985 | S | 9/2015 | Junginger | |
| D746,974 | S | 1/2016 | Ylitalo | |
| 9,247,775 | B2 | 2/2016 | Suzuki | |
| 9,289,568 | B2 | 3/2016 | Dhuper | |
| 9,291,757 | B2 | 3/2016 | Merrill | |
| D755,973 | S | 5/2016 | McGuire | |
| 9,375,544 | B2 | 6/2016 | Todd | |
| 9,423,545 | B2 | 8/2016 | Merrill | |
| 9,498,592 | B2 | 11/2016 | Dhuper | |
| 10,137,321 | B2 * | 11/2018 | Martin | A62B 9/02 |
| 2001/0006770 | A1 | 7/2001 | Chishti | |
| 2001/0015205 | A1 | 8/2001 | Bostock | |
| 2001/0055078 | A1 | 12/2001 | Lee | |
| 2002/0046754 | A1 | 4/2002 | Baumann | |
| 2002/0056450 | A1 | 5/2002 | Lee | |
| 2002/0104543 | A1 | 8/2002 | Hollander | |
| 2002/0170563 | A1 | 11/2002 | Japuntich | |
| 2002/0195108 | A1 | 12/2002 | Mittelstadt | |
| 2002/0195109 | A1 | 12/2002 | Mittelstadt | |
| 2003/0005934 | A1 | 1/2003 | Japuntich | |
| 2003/0015201 | A1 | 1/2003 | Bostock | |
| 2003/0084902 | A1 | 5/2003 | Japuntich | |
| 2003/0221690 | A1 | 12/2003 | Lee | |
| 2004/0004547 | A1 | 1/2004 | Appelt | |
| 2004/0011362 | A1 | 1/2004 | Angadjivand | |
| 2004/0040562 | A1 | 3/2004 | Brunell | |
| 2004/0055078 | A1 | 3/2004 | Griesbach, III | |
| 2004/0055605 | A1 | 3/2004 | Griesbach, III | |
| 2004/0078860 | A1 | 4/2004 | Bell | |
| 2004/0104543 | A1 | 6/2004 | Sakuma | |
| 2004/0226563 | A1 | 11/2004 | Xu | |
| 2004/0255946 | A1 | 12/2004 | Gerson | |
| 2004/0255947 | A1 | 12/2004 | Martin | |
| 2004/0261795 | A1 | 12/2004 | Brunell | |
| 2005/0001728 | A1 | 1/2005 | Appelt | |
| 2005/0016544 | A1 | 1/2005 | Thornton | |
| 2005/0051172 | A1 | 3/2005 | Lee | |
| 2005/0098180 | A1 | 5/2005 | Lien | |
| 2005/0133034 | A1 | 6/2005 | Jensen | |
| 2005/0139218 | A1 | 6/2005 | Bostock | |
| 2005/0252839 | A1 | 11/2005 | Curran | |
| 2006/0130842 | A1 | 6/2006 | Kleman | |
| 2006/0137691 | A1 | 6/2006 | Klemen | |
| 2006/0149209 | A1 | 7/2006 | Malchow | |
| 2006/0174890 | A1 | 8/2006 | Cheng | |
| 2006/0180152 | A1 | 8/2006 | Bostock | |
| 2006/0212996 | A1 | 9/2006 | McGrath | |
| 2007/0044803 | A1 | 3/2007 | Xue | |
| 2007/0068529 | A1 | 3/2007 | Kalatoor | |
| 2007/0078528 | A1 | 4/2007 | Anke | |
| 2007/0084469 | A1 | 4/2007 | McDonald | |
| 2007/0107734 | A1 | 5/2007 | Brunell | |
| 2007/0119459 | A1 | 5/2007 | Japuntich | |
| 2007/0144524 | A1 | 6/2007 | Martin | |
| 2007/0157932 | A1 | 7/2007 | Cerbini | |
| 2007/0175477 | A1 | 8/2007 | Baggett | |
| 2007/0272248 | A1 | 11/2007 | Lin | |
| 2007/0283964 | A1 | 12/2007 | Gorman | |
| 2008/0011303 | A1 | 1/2008 | Angadjivand | |
| 2008/0026172 | A1 | 1/2008 | Stelter | |
| 2008/0026173 | A1 | 1/2008 | Angadjivand | |
| 2008/0092909 | A1 * | 4/2008 | Hahne | A41D 13/1192 128/863 |
| 2008/0105261 | A1 | 5/2008 | Harold | |
| 2008/0178884 | A1 | 7/2008 | Gerson | |
| 2008/0271737 | A1 | 11/2008 | Facer | |
| 2008/0271739 | A1 | 11/2008 | Facer | |
| 2008/0271740 | A1 * | 11/2008 | Gloag | A62B 23/025 128/206.28 |
| 2009/0044809 | A1 | 2/2009 | Welchel | |
| 2009/0044811 | A1 | 2/2009 | Welchel | |
| 2009/0044812 | A1 | 2/2009 | Welchel | |
| 2009/0078261 | A1 | 3/2009 | Martin | |
| 2009/0078264 | A1 | 3/2009 | Martin | |
| 2009/0078265 | A1 | 3/2009 | Gebrewold | |
| 2009/0133700 | A1 | 5/2009 | Martin | |
| 2009/0151734 | A1 | 6/2009 | Park | |
| 2009/0211582 | A1 | 8/2009 | Reese | |
| 2009/0235934 | A1 * | 9/2009 | Martin | A62B 18/10 128/206.15 |
| 2009/0255542 | A1 | 10/2009 | Ugai | |
| 2010/0031962 | A1 | 2/2010 | Chiu | |
| 2010/0051032 | A1 | 3/2010 | Kim | |
| 2010/0065058 | A1 | 3/2010 | Ungar | |
| 2010/0083967 | A1 | 4/2010 | Kuriyama | |
| 2010/0095967 | A1 | 4/2010 | Bostock | |
| 2010/0126510 | A1 | 5/2010 | Gerson | |
| 2010/0132713 | A1 | 6/2010 | Gerson | |
| 2010/0154804 | A1 | 6/2010 | Duffy | |
| 2010/0154805 | A1 | 6/2010 | Japuntich | |
| 2010/0154806 | A1 | 6/2010 | Duffy | |
| 2010/0258133 | A1 | 10/2010 | Todd | |
| 2010/0263669 | A1 | 10/2010 | Bowsher | |
| 2011/0067700 | A1 | 3/2011 | Spoo | |
| 2011/0155138 | A1 | 6/2011 | Lin | |
| 2011/0180078 | A1 | 7/2011 | McKinley | |
| 2011/0197341 | A1 | 8/2011 | Formica | |
| 2011/0249332 | A1 | 10/2011 | Merrill | |
| 2011/0255163 | A1 | 10/2011 | Merrill | |
| 2011/0255167 | A1 | 10/2011 | Merrill | |
| 2011/0286095 | A1 | 11/2011 | Merrill | |
| 2012/0000473 | A1 | 1/2012 | Shigematsu | |
| 2012/0012177 | A1 | 1/2012 | Muduli | |
| 2012/0065607 | A1 | 3/2012 | Konig | |
| 2012/0090615 | A1 | 4/2012 | Chen | |
| 2012/0091381 | A1 | 4/2012 | Kern | |
| 2012/0103339 | A1 | 5/2012 | Koehler | |

(56) References Cited

U.S. PATENT DOCUMENTS

| | | | | |
|---|---|---|---|---|
| 2012/0125341 | A1 | 5/2012 | Gebrewold | |
| 2012/0167890 | A1 | 7/2012 | Insley | |
| 2012/0167891 | A1 | 7/2012 | Smaller | |
| 2013/0047955 | A1 | 2/2013 | Shibata | |
| 2013/0094084 | A1 | 4/2013 | Merrill | |
| 2013/0094085 | A1 | 4/2013 | Merrill | |
| 2013/0094088 | A1 | 4/2013 | Merrill | |
| 2013/0095434 | A1 | 4/2013 | Dunn | |
| 2013/0095435 | A1 | 4/2013 | Dunn | |
| 2013/0100647 | A1 | 4/2013 | Sherman | |
| 2013/0139823 | A1 | 6/2013 | Lee | |
| 2013/0153035 | A1 | 6/2013 | Young | |
| 2013/0170034 | A1 | 7/2013 | Merrill | |
| 2013/0186414 | A1 | 7/2013 | Suzuki | |
| 2013/0199535 | A1 | 8/2013 | Dhuper | |
| 2014/0034059 | A1 | 2/2014 | Yagi | |
| 2014/0135668 | A1 | 5/2014 | Belalcazar | |
| 2014/0182593 | A1 | 7/2014 | Duffy | |
| 2014/0182599 | A1* | 7/2014 | Duffy | A41D 13/1115<br>128/863 |
| 2014/0190492 | A1 | 7/2014 | Noh | |
| 2014/0202469 | A1 | 7/2014 | Smaller | |
| 2014/0326245 | A1 | 11/2014 | Teng | |
| 2014/0326255 | A1 | 11/2014 | Teng | |
| 2015/0047574 | A1 | 2/2015 | Jakubowski | |
| 2015/0059773 | A1 | 3/2015 | Duffy | |
| 2015/0101617 | A1 | 4/2015 | Duffy | |
| 2015/0238718 | A1 | 8/2015 | Schnell | |
| 2015/0328421 | A1 | 11/2015 | Stephenson | |
| 2017/0311661 | A1 | 11/2017 | Henderson | |
| 2017/0318875 | A1 | 11/2017 | Henderson | |
| 2017/0340031 | A1 | 11/2017 | Henderson | |

FOREIGN PATENT DOCUMENTS

| | | |
|---|---|---|
| CN | 201270776 | 7/2009 |
| CN | 201543133 | 11/2009 |
| CN | 201550643 | 8/2010 |
| CN | 201551752 | 8/2010 |
| CN | 101897484 | 12/2010 |
| CN | 201967734 | 9/2011 |
| CN | 202456521 | 10/2012 |
| CN | 202552239 | 11/2012 |
| CN | 202588368 | 12/2012 |
| CN | 202618364 | 12/2012 |
| EM | 001909623-0001 | 8/2001 |
| EP | 183059 | 6/1986 |
| EP | 209838 | 1/1987 |
| EP | 928917 | 7/1999 |
| EP | 814871 | 1/2002 |
| EP | 1366784 | 12/2003 |
| EP | 1417988 | 5/2004 |
| EP | 2070563 | 6/2009 |
| EP | 2142261 | 1/2010 |
| EP | 2298419 | 3/2011 |
| EP | 2486815 | 8/2012 |
| FR | 2641597 | 7/1990 |
| FR | 2621459 | 12/1990 |
| FR | 2688287 | 9/1993 |
| FR | 2889916 | 8/2006 |
| GB | 388638 | 3/1933 |
| GB | 504232 | 4/1939 |
| GB | 2072516 | 10/1981 |
| GB | 2103491 | 2/1983 |
| GB | 2237746 | 5/1991 |
| GB | 2304054 | 3/1997 |
| GB | 2329128 | 3/1999 |
| GB | 2433701 | 7/2007 |
| JP | 60-116352 | 8/1985 |
| JP | 8332239 | 12/1996 |
| JP | 9-103510 | 4/1997 |
| JP | 3045995 | 8/1997 |
| JP | 9-239050 | 9/1997 |
| JP | 11-501840 | 2/1999 |
| JP | 3072027 | 9/2000 |
| JP | 2001-000565 | 1/2001 |
| JP | 2001-161843 | 6/2001 |
| JP | 2001-204833 | 7/2001 |
| JP | 2002-325855 | 11/2002 |
| JP | 2003-047688 | 2/2003 |
| JP | 2003-236000 | 8/2003 |
| JP | 2003-265635 | 9/2003 |
| JP | 3101352 | 10/2003 |
| JP | 2004-173777 | 6/2004 |
| JP | 3101212 | 6/2004 |
| JP | 3622958 | 12/2004 |
| JP | 2005-013492 | 1/2005 |
| JP | 2005-034618 | 2/2005 |
| JP | 3108880 | 4/2005 |
| JP | 2005-348998 | 12/2005 |
| JP | 2006-314618 | 11/2006 |
| JP | 2006-320629 | 11/2006 |
| JP | 2007-054270 | 3/2007 |
| JP | 3138154 | 11/2007 |
| JP | 2010-279637 | 12/2010 |
| JP | 3167135 | 1/2011 |
| JP | 2011-092282 | 5/2011 |
| JP | 2012-232080 | 5/2011 |
| JP | 2014-200316 | 10/2014 |
| KR | 20-1989-0005113 | 11/1989 |
| KR | 20-2000-0004542 | 3/2000 |
| KR | 20-0321107 | 7/2003 |
| KR | 20-0348888 | 4/2004 |
| KR | 10-0510164 | 8/2005 |
| KR | 10-0529000 | 11/2005 |
| KR | 2012-0012520 | 2/2012 |
| KR | 10-1289538 | 7/2013 |
| SU | 11567 | 9/1929 |
| TW | 349412 | 4/1987 |
| TW | M435859 | 8/2012 |
| TW | 201318666 | 5/2013 |
| TW | M464196 | 11/2013 |
| WO | WO 96/28216 | 9/1996 |
| WO | WO 1996/28217 | 9/1996 |
| WO | WO 1997/32494 | 9/1997 |
| WO | WO 1999/24119 | 5/1999 |
| WO | WO 1999/47010 | 9/1999 |
| WO | WO 2000/48481 | 8/2000 |
| WO | WO 2001/30449 | 5/2001 |
| WO | WO 2001/58293 | 8/2001 |
| WO | WO 2004/028637 | 4/2004 |
| WO | WO 2007/024865 | 3/2007 |
| WO | WO 2007/058442 | 5/2007 |
| WO | WO 2008/010102 | 1/2008 |
| WO | WO 2008/085546 | 7/2008 |
| WO | WO 2008/137205 | 11/2008 |
| WO | WO 2008/137272 | 11/2008 |
| WO | WO 2009/038904 | 3/2009 |
| WO | WO 2009/048748 | 4/2009 |
| WO | WO 2010/075340 | 7/2010 |
| WO | WO 2010/075357 | 7/2010 |
| WO | WO 2010/075363 | 7/2010 |
| WO | WO 2010/075373 | 7/2010 |
| WO | WO 2010/075383 | 7/2010 |
| WO | WO 2010/143319 | 12/2010 |
| WO | WO 2011/025094 | 3/2011 |
| WO | WO 2012/012177 | 1/2012 |
| WO | WO 2012/030798 | 3/2012 |
| WO | WO 2012/068091 | 5/2012 |

OTHER PUBLICATIONS

Interior definition. Merriam Webster Online Dictionary. definition 1. https://www.merriam-webster.com/dictionary/interior (Year: 2020).*

External definition. Merriam Webster Online Dictionary. definition 2a. https://www.merriam-webster.com/dictionary/external (Year: 2021).*

Interior definition. Merriam Webster Online Dictionary. definition 1. https://www.merriam-webster.com/dictionary/interior (Year: 2021).*

International Search Report for PCT International Application No. PCT/US2015/063577, mailed on Feb. 25, 2016, 5pgs.

"20 Pack NIOSH N95 Respirator", Menards, [retrieved from the internet on Jun. 29, 2017], URL <http://www.menards.com/main/

(56) References Cited

OTHER PUBLICATIONS paint/drop-cloths-plastic-sheeting/protective-wear/respiratory-protection/20-pack-niosh-n95-respirator/p-2006906-c-13847.htm> pp. 1-2.

3M 1818 Surgical Mask 3M Surgical Face Mark, TieOn, One Size Fits Most 50Bx 1818 | Zoro.

3M 1820 Surgical Mask https://www.tigermedical.com/Products/Earloop-Procedure-Masks-with-Optional-Face-Shield MMM1820-.aspx.

3M 1823 Surgical Mask https://www.tigermedical.com/Products/Ultra-Soft-Tie-On-Surgical-Mask MMM1833.aspx.

Branson Ultrasonics Corporation Data Sheet PW-45 for Ultrasonic Fabric Sealing System Modesl F-90 and FS-90 (1992). https://www.chasemachine.com/redesign/wp-content/uploads/2019/11/Chase-FS-90.pdf.

Cera France product brochure for "Rotosonic 250T Ultrasonic Seaming Machine" https://www.industry-plaza.com/rotosonic-250/ultrasonic-seaming-machi-p21438220.html.

Davies, "The Separation of Airborne Dust Particles", Proceedings of the Institution of Mechanical Engineers 1B, 1953, pp. 185-213.

Europa Safety Products (ESP) product literature "The Next Generation In Safety" for their CN range of respirators (no date).

Galemed Oxi.Plust™ Oxygen Mask [retrieved from internet on Jul. 24, 2017] http://www.medicalexpo.com/prod/galemed-corporation/product-68550-774148.html#product-item_510581.

Glendale Optical Company Product Literature for "Glendale Respiratory Protection" (Feb. 1983).

Herrmann Ultrasonics product brochure for "Ultrasonic Bonding and Cutting of Nonwovens, Textiles, Film and Paper Non-Contact/Non-Wear" https://www.herrmannultrasonics.com/en-us/products/ultrasonic-welding-machines?gad=1&clid=CjwKCAjw92iBhBPEiwAErwpeYMv9FE1GuhBQe0k1VtLUJO-vGllrEanMg2lxpGNDkBHGejzcQFiVhoCcilQAvD_BwE.

"Honeywell SAF-T-FIT Plus Disp. N95 Particulate Respirator Boomerang Nose Seal—Molded Cup-Valve-OV", [retrieved from the internet on Jul. 18, 2017], URL<https://www.fullsource.com/honeywell-n1125ov/>, 3 pgs.

"Respiratory Safety", Protective Industrial Products, [retrieved from the internet on Jun. 29, 2017], URL <http://www.pipusa.com/en/products/?scID=2566&ccID=11571&SID=27955&ssID=79604&pID=47677>, p. 1.

Sonobond product literature for Ultrasonic Cylinder Arm Machines https://sonobondultrasonics.com/products/cylinder-arm-machines/.

Tecnol PCM 2000 Surgical Mask https://www.tigermedical.com/Products/PCM2000-Mask-with-Polyurethane-Headbands KIM47717 KIM 47700-.aspx.

Tecnol Duckbill Surgical Mask https://www.henryschein.co.nz/infection-control/masks/masks-tie-on/tecnol-duckbill-surgical-mask-tie-on-blue-box-of-50.

3M Infection Prevention Solutions, 3M™ Surgical Masks, Respirators and Eyewear; © 3M Health Care 2011. https://cdn.shopify.com/s/files/1/1046/1086/files/3M-infection-Prevention-Solutions-Brochure.pdf.

3M Infection Prevention; Surgical Masks and Respirators, © 3M 2008. https://cdn.shopify.com/x/files/1/1046/1086/files/3M-Infection-Prevention-Surgical-Maska-and-Respirators.pdf.

Wente, "Manufacture of Super Fine Organic Fibers", Report No. 4364, Navel Research Laboratories, May 25, 1954, 24pgs.

Wente, "Superfine Thermoplastic Fibers", Industrial Engineering Chemistry, 1956, vol. 48, pp. 1342-1346.

* cited by examiner

RESPIRATOR TAB

CROSS REFERENCE TO RELATED APPLICATIONS

This application is a national stage filing under 35 U.S.C. 371 of PCT/US2015/063577, filed Dec. 3, 2015, which claims the benefit of Great Britain Application No. 1421617.0, filed Dec. 4, 2014, the disclosure of which is incorporated by reference in its/their entirety herein.

FIELD

The present invention relates to personal respiratory protection devices, known as respirators or face masks, which are capable of being folded flat during storage and forming a cup-shaped air chamber over the mouth and nose of a wearer during use.

BACKGROUND

Filtration respirators or face masks are used in a wide variety of applications when it is desired to protect a human's respiratory system from particles suspended in the air or from unpleasant or noxious gases. Generally such respirators or face masks may come in a number of forms, but the two most common are a molded cup-shaped form or a flat-folded form. The flat-folded form has advantages in that it can be carried in a wearer's pocket until needed and re-folded flat to keep the inside clean between wearings.

Such respiratory devices include, for example, respirators, surgical masks, clean room masks, face shields, dust masks, breath warming masks, and a variety of other face coverings.

Flat-fold respirators are typically formed from a sheet filter media which removes the suspended particles from the air prior to inhalation by the user. Performance of the respirator is therefore reliant on minimizing the flow of air that bypasses the filter medium prior to inhalation. It is recognized that the primary route for bypass air is between the respirator and the face of the user. It is therefore imperative to provide a close fit between the respirator and the face in order to minimize the bypass airflow. This is particularly challenging in the region of the nose of the user given the protrusion of the nose from the face and the ergonomic variations in the size and shape of the nose of different users.

Flat-fold respirators are typically formed from a sheet filter medium which is folded or joined to form two or more panels. The panels are opened out prior to or during the donning process to form the air chamber. Often an exhalation valve is provided on one of the panels in order to reduce the respiratory effort of exhaling.

It is common for the user of the respirator to be wearing additional safety equipment such as goggles, gloves or protective clothing. This can impair the ability of the user to efficiently don the respirator. This can reduce the effectiveness of the respirator due to impaired fit or comfort.

It is also recognized that at times the user holds the outer edges of the respirator during the donning procedure. This causes the user to touch the inside surface of the respirator. This can be disadvantageous in certain environments such as surgical use.

Furthermore it is recognized that the adequate opening of the respirator prior to donning affects the ease of donning and the perceived comfort of the wearer once the respirator is in position. There is therefore a perceived need to improve the ease of opening and donning of the respirator. Similarly there is a perceived need to reduce the likelihood that the internal surface of the respirator is handled during the donning and doffing the respirator.

It is an object of the present invention to at least mitigate the above problems by providing a personal respiratory protection device which opens effectively and is easier to open and don.

SUMMARY

Accordingly, the invention provides a personal respiratory protection device comprising:

an upper panel, a central panel, and a lower panel, the central panel being separated from each of the upper and lower panels by a first and second fold, seam, weld or bond, respectively, such that device is capable of being folded flat for storage along the first and second fold, seam, weld or bond and opened to form a cup-shaped air chamber over the nose and mouth of the wearer when in use, wherein the lower panel has a graspable tab attached to an interior portion of an external surface of the lower panel, the tab being graspable in use to open the device.

Advantageously, the provision of a graspable tab at attached to the lower panel enables the user to open the respirator without making contact with the inside surface of the respirator. Furthermore the positioning of the tab at the interior of the lower panel rather than, for example, the lower outer periphery optimizes the opening of the respirator as the point of action (i.e. the point of attachment) of the tab on the lower panel is closer to the axis of rotation of the lower panel relative to the front panel. In other words, the interior of the lower panel is pulled downwardly and outwardly rather than the lower outer periphery of the lower panel being pulled. This causes the middle of the lower panel to open wide which forms an air chamber which more closely matches the face of the user.

Preferably, the lower panel has a lateral storage fold when stored, the fold extending through the interior section, the tab being attached to the lower panel at a position proximate the lateral storage fold.

Advantageously, this feature allows the tab to act on the lower panel near to the fold. This is an advantage since the fold has a greater distance to travel during the opening process than any other point on the lower panel. Furthermore, the tab acting on the lower panel near the fold allows the lower panel to open into a convex shape that matches the profile of the face.

Preferably the graspable tab is positioned within 10 mm above or below the lateral fold.

Preferably, the graspable tab is positioned on the lateral fold.

Preferably, the graspable tab is between 10 mm and 40 mm in width at its point of attachment to the lower panel, preferably 15 mm.

Advantageously, the provision of a wider tab increases the width of the line of action of the tab on the panel. This allows the tab to pull the panel open over a wider section of the panel which better conforms the lower panel to the chin of the wearer Preferably, the graspable tab is positioned on a longitudinal centerline of the device.

Advantageously, this feature allows the respirator to open symmetrically.

Preferably, at least a portion of the tab is visible to a user when the device is folded.

Advantageously, this feature indicates to the user that the tab is to be grasped and pulled in order to open the mask. This reduces the chance of the user touching the inside surface of the respirator.

Preferably, the lower panel is folded to form the lateral fold at a position approximately equidistant between the second fold, seam, weld or bond and a lower outer periphery of the lower panel.

Preferably, the device has a multi-layered structure that comprises a first inner cover web, a filtration layer that comprises a web that contains electrically-charged microfibers, and a second outer cover web, the first and second cover webs being disposed on first and second opposing sides of the filtration layer, respectively, wherein the nose conforming element is attached to the second cover web.

Preferably, the personal respiratory protection device comprises a resiliently compliant headband secured to the central panel.

Preferably, the headband is positioned forward of the tab towards the central panel when the device is folded.

Preferably, the personal respiratory protection device further comprises an exhalation valve that is disposed on the central panel.

Preferably, the valve has a grip region which is grippable by the user, the grip region being configured to indicate to the user that the valve is to be gripped during opening and donning of the device.

DETAILED DESCRIPTION

The invention will now be described, by way of example only, in which.

Figure 1:
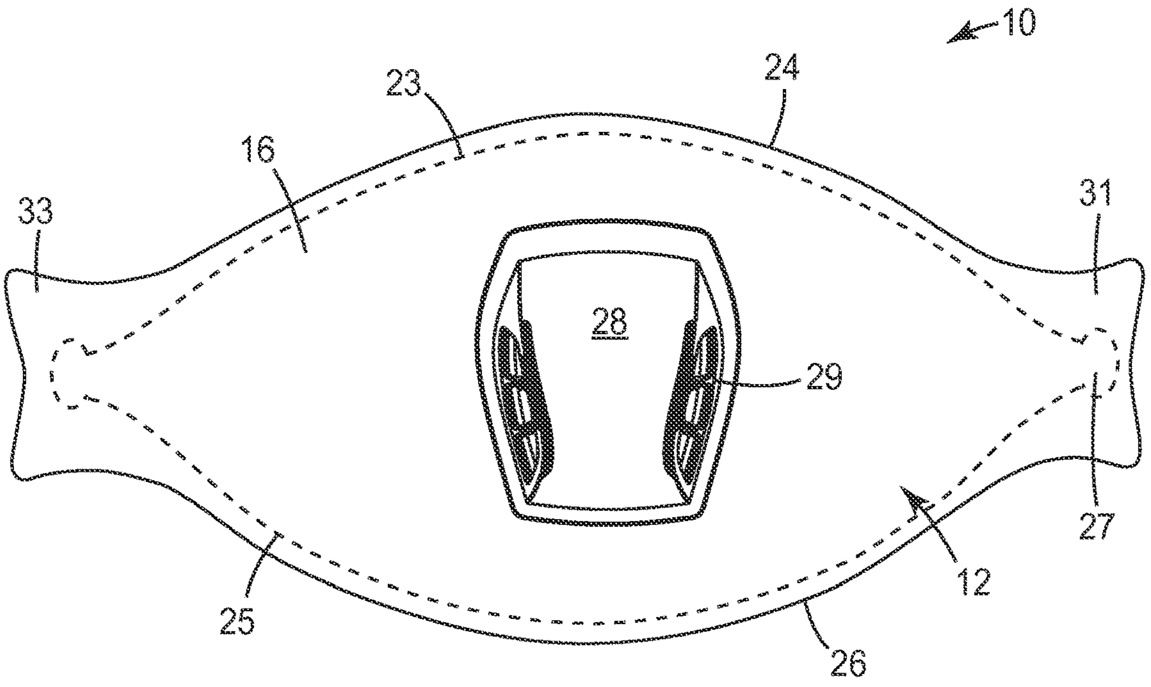
FIG. 1 is a front view of a personal respiratory protection device of the current invention in its flat-fold configuration.
Figure 2:
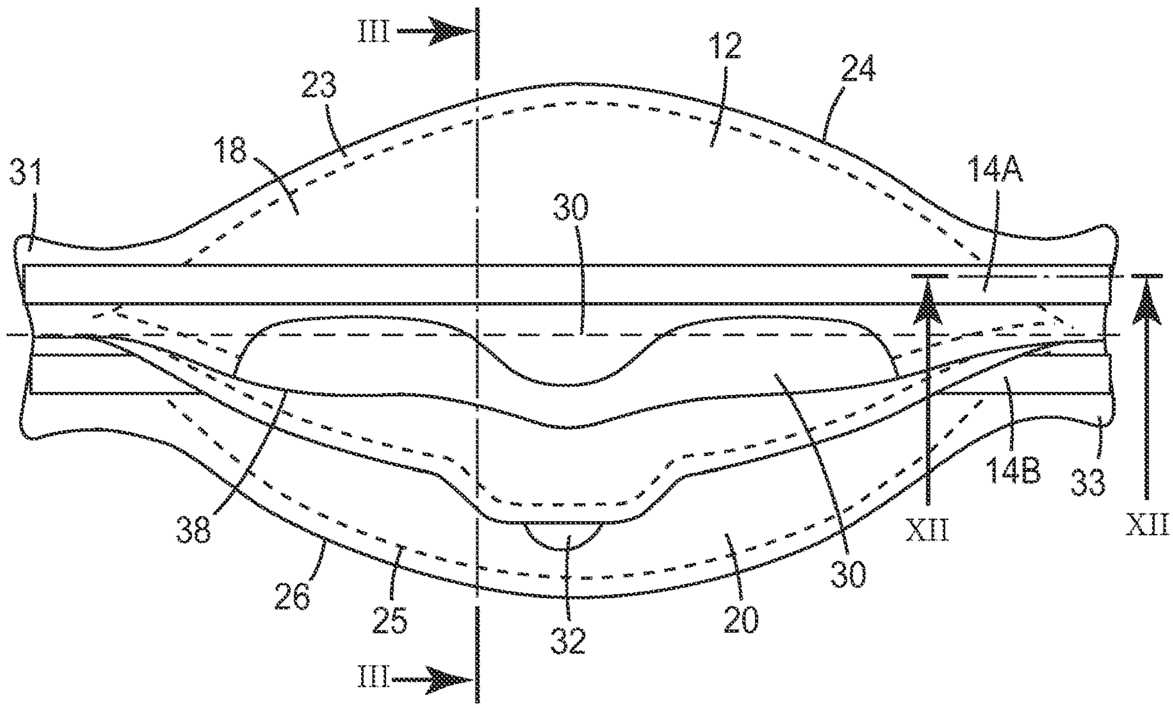
FIG. 2 is a rear view of the personal respiratory protection device of FIG. 1 in its flat-fold configuration.
Figure 3:
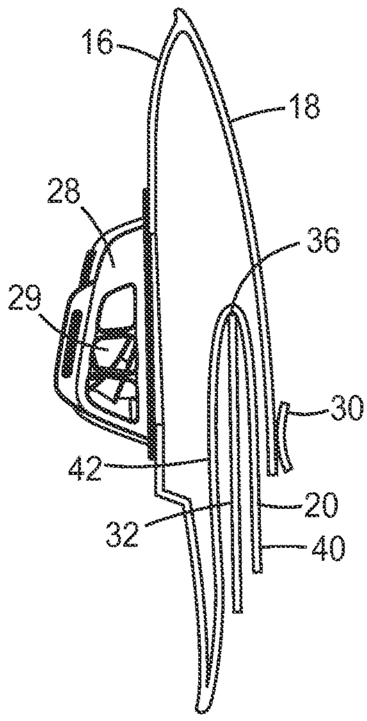
FIG. 3 is a cross-section of the personal respiratory protection device shown in FIG. 1 taken along line III-III in FIG. 2.

FIG. 1 shows a personal respiratory protection device in the form of a respirator (also commonly referred to as a mask) indicated generally at 10. The respirator 10 is a flat-fold respirator which is shown in FIGS. 1 to 3 in its stored (also known as flat-fold or flat-folded) configuration. In this configuration the respirator is substantially flat so that it may be readily stored in the pocket of a user.

Figure 9:
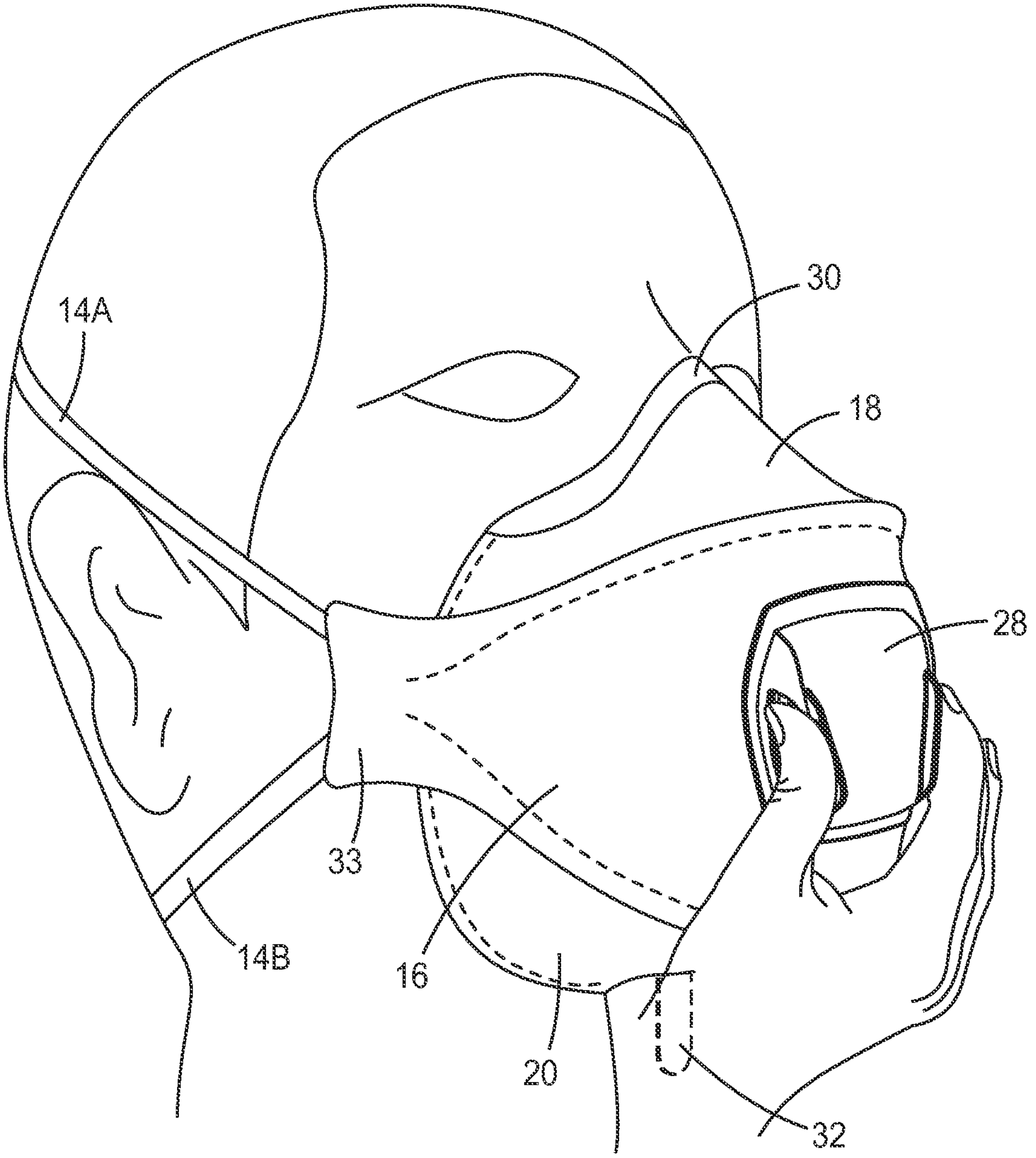
FIG. 9 is a front perspective view of the personal respiratory protection device of FIG. 1 shown in its open configuration on the face of a user and being held by a user.

The respirator 10 has a main body indicated generally at 12 and a headband 14 formed of two sections 14A, 14B. The main body 12 has a central panel 16, an upper panel 18 and a lower panel 20. In use, the upper panel 18 and lower panel 20 are opened outwardly from the central panel 16 to form a cup-shaped chamber 22 (shown in FIG. 6). Once opened, the respirator is then applied to the face (as shown in FIG. 9) as will be described in further detail shortly.

The respirator 10 is formed from folded and welded portions of multi-layered filter material to form three portions or panels, as will be discussed in further detail below. The respirator 10 has a multi-layered structure that comprises a first inner cover web, a filtration layer that comprises a web that contains electrically-charged microfibers, and a second outer cover web, the first and second cover webs being disposed on first and second opposing sides of the filtration layer, respectively.

The filter material may be comprised of a number of woven and nonwoven materials, a single or a plurality of layers, with or without an inner or outer cover or scrim. Preferably, the central panel 16 is provided with stiffening means such as, for example, woven or nonwoven scrim, adhesive bars, printing or bonding. Examples of suitable filter material include microfiber webs, fibrillated film webs, woven or nonwoven webs (e.g., airlaid or carded staple fibers), solution-blown fiber webs, or combinations thereof. Fibers useful for forming such webs include, for example, polyolefins such as polypropylene, polyethylene, polybutylene, poly(4-methyl-1-pentene) and blends thereof, halogen substituted polyolefins such as those containing one or more chloroethylene units, or tetrafluoroethylene units, and which may also contain acrylonitrile units, polyesters, polycarbonates, polyurethanes, rosin-wool, glass, cellulose or combinations thereof.

Fibers of the filtering layer are selected depending upon the type of particulate to be filtered. Proper selection of fibers can also affect the comfort of the respiratory device to the wearer, e.g., by providing softness or moisture control. Webs of melt blown microfibers useful in the present invention can be prepared as described, for example, in Wente, Van A., "Superfine Thermoplastic Fibers" in Industrial Engineering Chemistry, Vol. 48, 1342 et seq. (1956) and in Report No. 4364 of the Navel Research Laboratories, published May 25, 1954, entitled "Manufacture of Super Fine Organic Fibers" by Van A. Wente et al. The blown microfibers in the filter media useful on the present invention preferably have an effective fiber diameter of from 3 to 30 micrometers, more preferably from about 7 to 15 micrometers, as calculated according to the method set forth in Davies, C. N., "The Separation of Airborne Dust Particles", Institution of Mechanical Engineers, London, Proceedings 1B, 1952.

Staple fibers may also, optionally, be present in the filtering layer. The presence of crimped, bulking staple fibers provides for a more lofty, less dense web than a web consisting solely of blown microfibers. Preferably, no more than 90 weight percent staple fibers, more preferably no more than 70 weight percent are present in the media. Such webs containing staple fiber are disclosed in U.S. Pat. No. 4,118,531 (Hauser).

Bicomponent staple fibers may also be used in the filtering layer or in one or more other layers of the filter media. The bicomponent staple fibers which generally have an outer layer which has a lower melting point than the core portion can be used to form a resilient shaping layer bonded together at fiber intersection points, e.g., by heating the layer so that the outer layer of the bicomponent fibers flows into contact with adjacent fibers that are either bicomponent or other staple fibers. The shaping layer can also be prepared with binder fibers of a heat-flowable polyester included together with staple fibers and upon heating of the shaping layer the binder fibers melt and flow to a fiber intersection point where they surround the fiber intersection point. Upon cooling, bonds develop at the intersection points of the fibers and hold the fiber mass in the desired shape. Also, binder materials such as acrylic latex or powdered heat actuable adhesive resins can be applied to the webs to provide bonding of the fibers.

Electrically charged fibers such as are disclosed in U.S. Pat. No. 4,215,682 (Kubik et al.), U.S. Pat. No. 4,588,537 (Klasse et al.) or by other conventional methods of polarizing or charging electrets, e.g., by the process of U.S. Pat. No. 4,375,718 (Wadsworth et al.), or U.S. Pat. No. 4,592,815 (Nakao), are particularly useful in the present invention. Electrically charged fibrillated-film fibers as taught in U.S. Pat. No. RE. 31,285 (van Turnhout), are also useful. In general the charging process involves subjecting the material to corona discharge or pulsed high voltage.

Sorbent particulate material such as activated carbon or alumina may also be included in the filtering layer. Such particle-loaded webs are described, for example, in U.S. Pat. No. 3,971,373 (Braun), U.S. Pat. No. 4,100,324 (Anderson) and U.S. Pat. No. 4,429,001 (Kolpin et al.). Masks from particle loaded filter layers are particularly good for protection from gaseous materials.

At least one of the central panel 16, upper panel 18 and lower panel 20 of the respiratory device of the present invention must comprise filter media. Preferably at least two of the central panel 16, upper panel 18 and lower panel 20 comprise filter media and all of the central panel 16, upper panel 18 and lower panel 20 may comprise filter media. The portion(s) not formed of filter media may be formed of a variety of materials. The upper panel 18 may be formed, for example, from a material which provides a moisture barrier to prevent fogging of a wearer's glasses. The central panel 16 may be formed of a transparent material so that lip movement by the wearer can be observed.

The central panel 16 has a curvilinear upper peripheral edge 24 which is coexistent with an upper bond 23 between the central panel 16 and the upper portion 18. A curvilinear lower peripheral edge 26 is coexistent with a lower bond 25 between the central panel 16 and the lower panel 20. The bonds 23, 25 take the form of ultrasonic welds but may alternatively be folds in the filter material or alternative methods of bonding. Such alternative bonds may take the form of adhesive bonding, stapling, sewing, thermomechanical connection, pressure connection, or other suitable means and can be intermittent or continuous. Any of these welding or bonding techniques leaves the bonded area somewhat strengthened or rigidified.

The bonds 23, 25 form a substantially airtight seal between the central panel 16 and the upper and lower panels 18, 20, respectively and extend to the longitudinal edges 27 of the respirator where the central upper, lower panels 16, 18, 20 collectively form headband attachment portions in the form of lugs 31, 33. The central panel 16 carries an exhalation valve 28 which reduces the pressure drop across the filter material when the user exhales. The valve 28 has grip portions 29 which ease the opening, donning and doffing of the respirator as will be described in further detail below.

Figure 7:
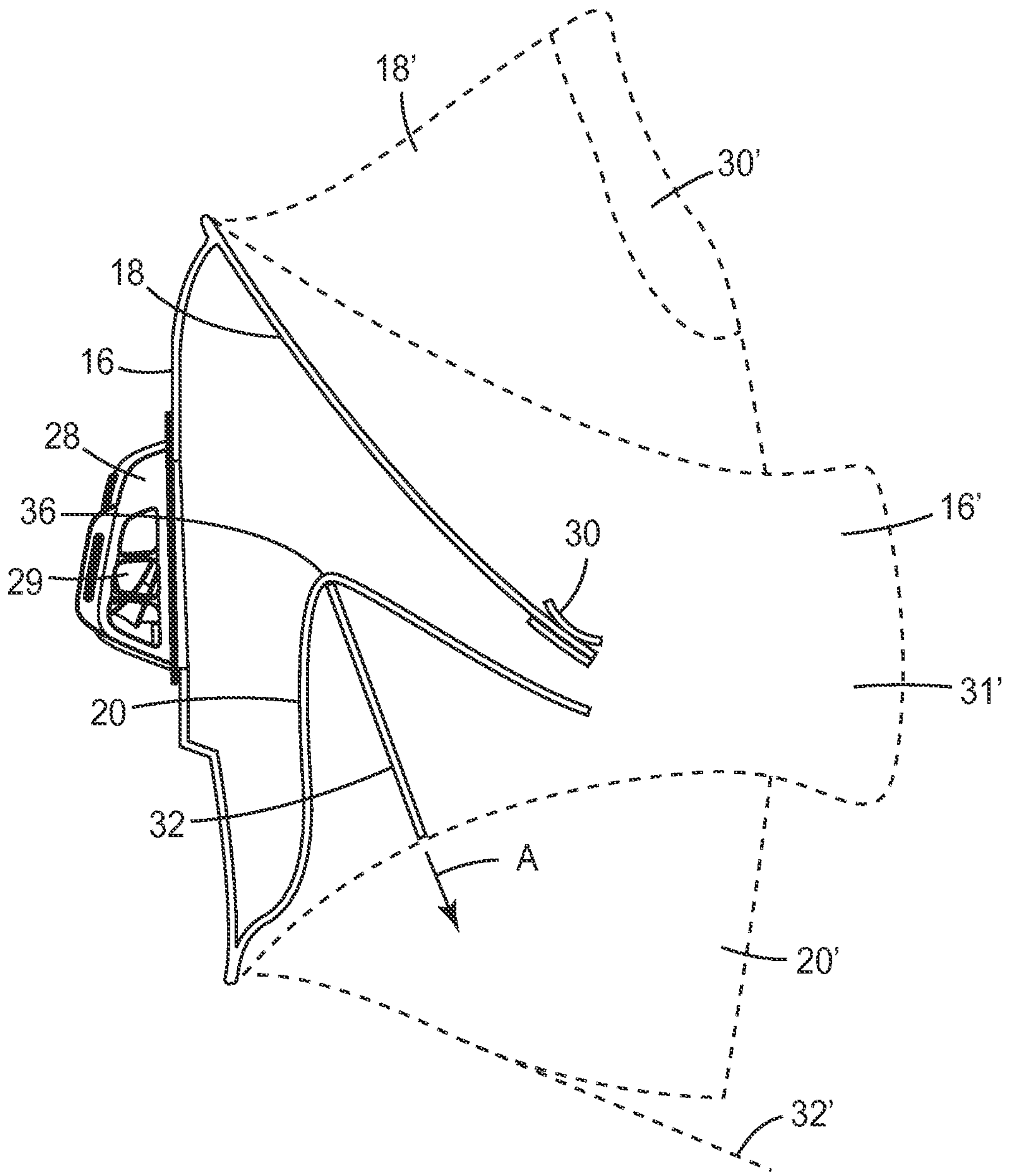
FIG. 7 is a cross-sectional view of the personal respiratory protection device of FIG. 1 shown in its intermediate configuration with the open configuration non-cross-sectioned side view shown in dotted lines.

The upper portion 18 carries a nose conforming element in the form of nosepiece 30 which conforms to the face of the user to improve the seal formed between the respirator 10 and the face of the user. The nosepiece 30 is arranged centrally at the upper outer periphery 38 of the upper portion 18 and is shown in section in FIG. 3 and in greater detail in FIG. 14. The nosepiece operates in conjunction with a nose pad 35 which is shown in FIG. 7 to be located on the opposite side of the upper panel 18 to the nosepiece 30 and serves the propose of softening the point of contact between the nose and the upper panel 18.

Figure 6:
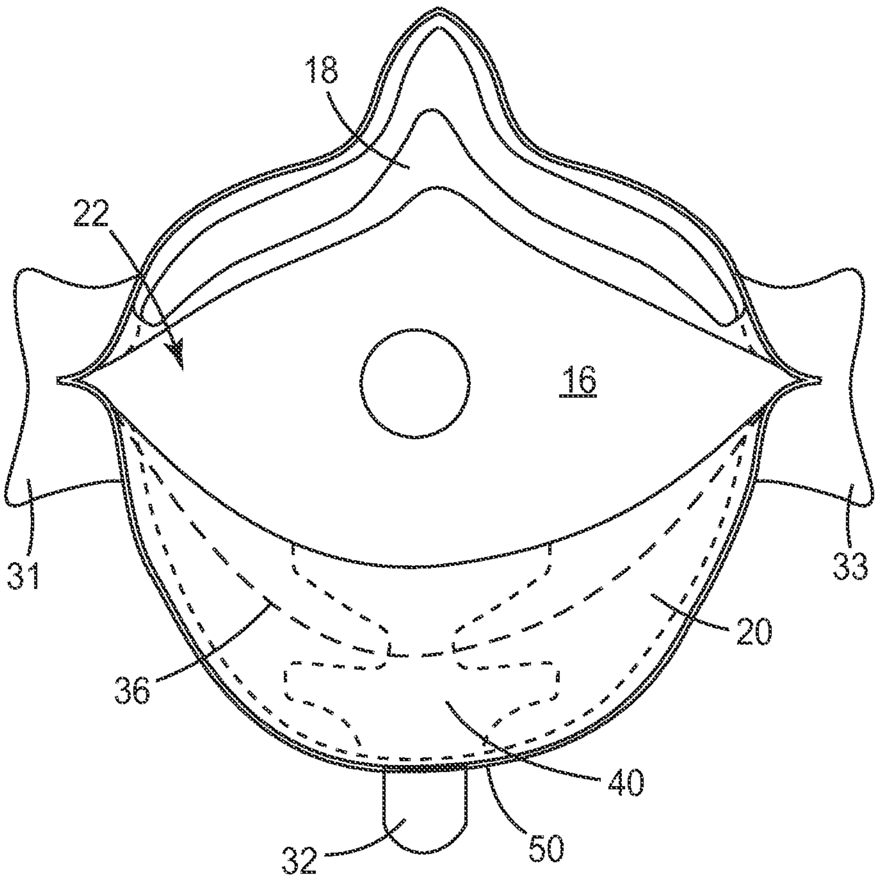
FIG. 6 is a rear view of the personal respiratory protection device of FIG. 1 shown in its open configuration.

Turning now to FIG. 3, the arrangement of the features of the respirator 10 in its stored configuration is shown in greater detail. The nosepiece 30 is shown positioned on the outer surface of the upper portion 18. The upper portion 18 is shown at the rearward side of the folded respirator 10 overlapping the lower panel 20. The lower panel 20 is folded about a lateral fold 36 (shown as a long dotted line in FIG. 2). The lateral fold 36 divides the lower panel 20 into an outer section 40 and an inner section 42. Attached to the lower panel 20 is a tab 32 which assists in the opening and donning of the respirator as will be described in further detail below. The tab 32 has a base which is attached to an interior portion of the exterior surface lower panel 20 (that is to say inwardly of a lower outer periphery 50 (as shown in FIG. 6) and the lower bond 25) at a position proximate the lateral fold 36 and ideally attached at the fold 36 as shown in FIG. 3. The positioning of the tab 32 may vary within 10 mm either side of the lateral fold. The width of the tab 32 at its point of attachment to the lower panel 20 is 15 mm although this width may vary between 10 mm and 40 mm.

Figure 4:
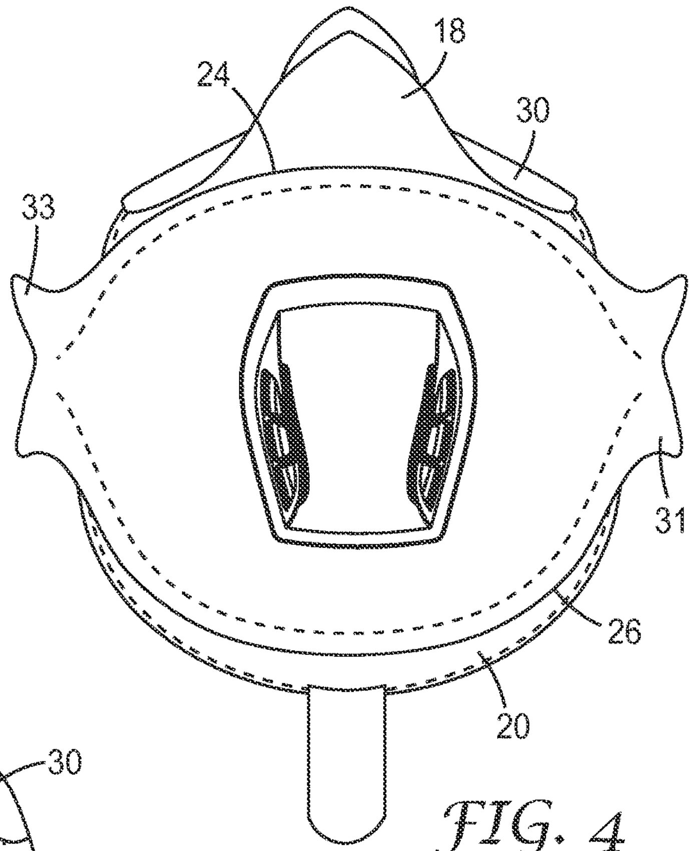
FIG. 4 is a front view of the personal respiratory protection device of FIG. 1 shown in its open configuration.
Figure 5:
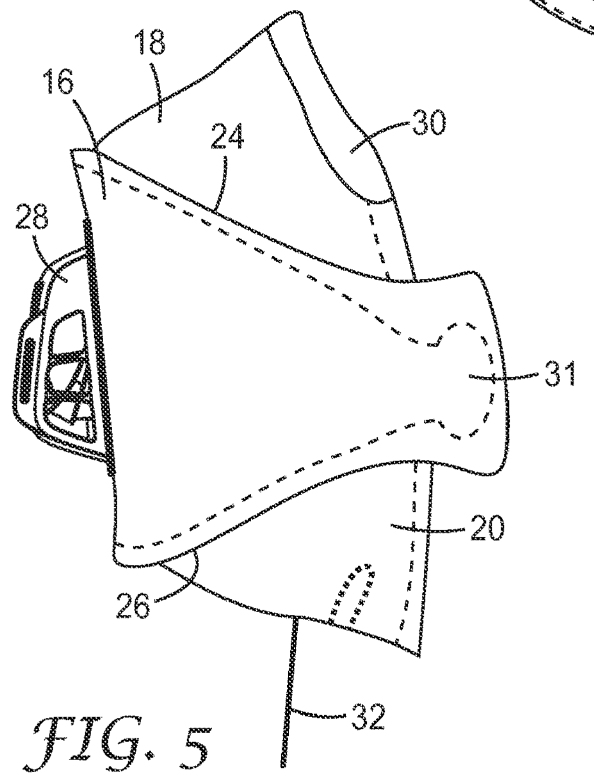
FIG. 5 is a side view of the personal respiratory protection device of FIG. 1 shown in open ready-to-use configuration.

FIGS. 4, 5 and 6 show the respirator 10 in its open configuration. The central panel 16 is no longer flat as shown in FIGS. 1 to 3 but is now curved rearwardly from the valve 28 to the lugs 31, 33. The shape of this curve approximately conforms to the mouth area of the face of the user. The upper portion 18 is pivoted about the curvilinear upper peripheral edge 24 and is curved to form a peak which matches the shape of the nose of the user. Similarly, the lower panel 20 is pivoted about the curvilinear lower peripheral edge 24 to form a curve which matches the shape of the neck of the user.

The opening of the respirator 10 between the folded configuration shown in FIGS. 1 to 3 and the open configuration shown in FIGS. 4 to 6 will now be described in greater detail with reference to FIG. 7.

FIG. 7 shows a cross-section of the respirator 10 sectioned along the same line as FIG. 3 but with the respirator shown in an intermediate configuration. Dotted lines show the respirator in the open configuration for comparison.

To open and don the respirator, the user first grips the grip portions 29 of the valve 28 (see FIG. 9). With the other hand the user takes hold of the tab 32 and pulls the tab 32 in direction A as indicated in FIG. 7 in order to apply an opening force to the valley side of the lateral fold 36. The tab may be textured to improve grip or may be coloured to better distinguish from the main body of the respirator. This opening force causes the fold 36 to move rearwardly and downwardly with respect to the central panel 16. This causes the lower panel 20 to pivot about the curvilinear lower peripheral edge 24. Simultaneously, load is transferred from the base of the tab 32 to the lugs 31, 33. This pulls the lugs 31, 33 inwardly causing the central panel 16 to curve. The curvature of the central panel 16 in turn applies a load (primarily via the lugs 31, 33) to the upper portion 18. This causes the longitudinal centre of the upper portion 18 to elevate as shown in FIGS. 6 and 7.

As the user continues to pull the tab 32 beyond the intermediate position shown in FIG. 7 the lugs 31, 33 continue to move closer to one another as the central panel 16 become increasingly curved. This in turn causes the continued upward movement of the upper portion 18 and downward movement of the lower panel 20 towards the open position (dotted lines in FIG. 7). In this way the tab 32 improves the opening mechanism of the respirator by ensuring that the load applied by the user to open the respirator 10 is most effectively and efficiently deployed to open the respirator 10.

Figure 8:
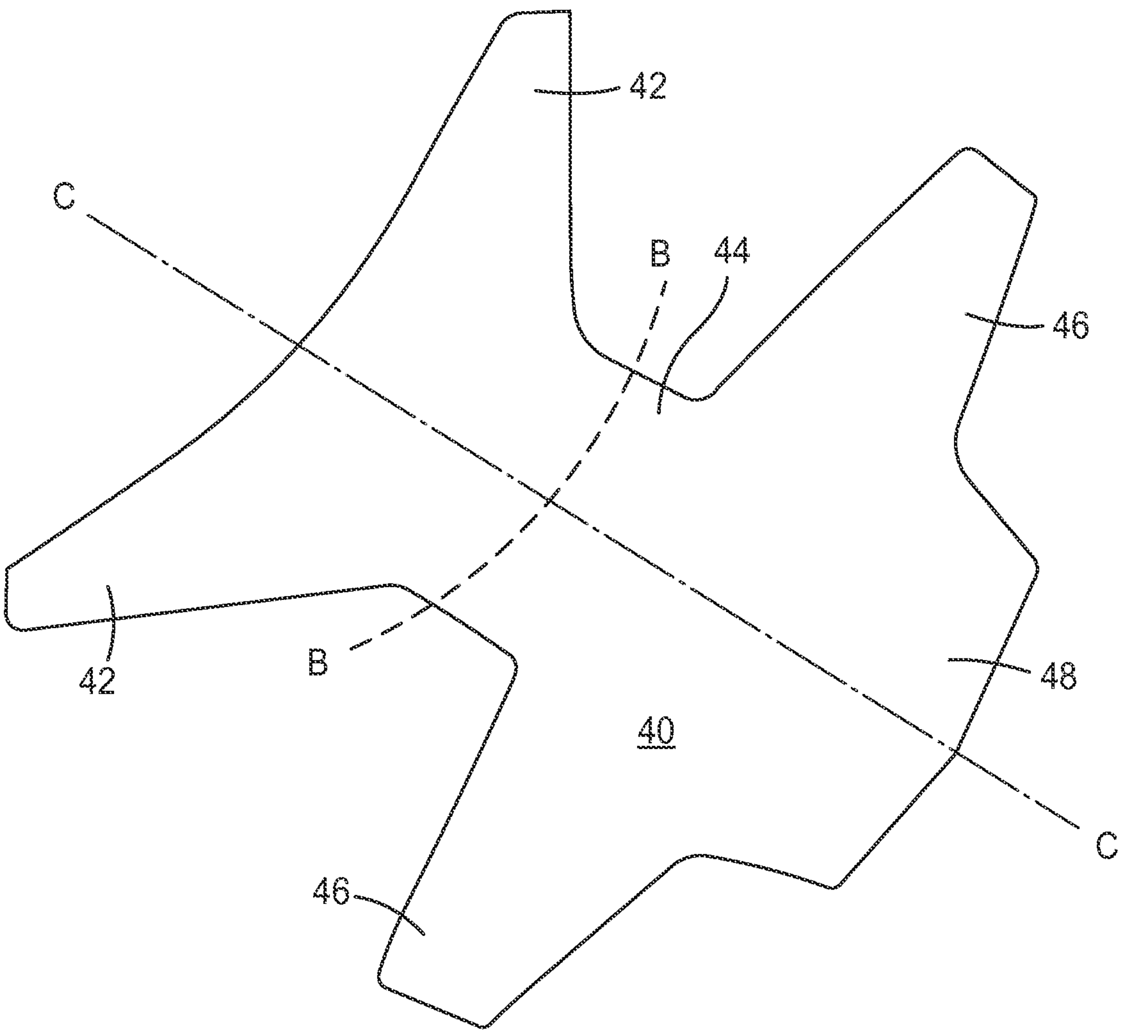
FIG. 8 is a detailed top perspective view of the stiffening panel of the respirator of FIG. 1.

The lower panel 20 is shown to include a stiffening sheet in the form of panel 40 (shown in long dotted lines). The stiffening panel 40 forms part of the multilayered filter material and is formed from material well known in the art for its stiffening properties. The stiffening panel 40 is approximately hour-glass shaped and is shown in greater detail in FIG. 8 to include a first pair of wings 42, a waist portion 44, a second pair of wings 46 and a front section 48. The front section 48 is coexistent with the lower outer periphery 50 (as shown in FIG. 6) of the lower panel 20 and the waist section is coexistent with the lateral fold 36. When the respirator 10 is in its folded configuration, the stiffening panel 40 is folded along al lateral crease indicated at line B-B. As the respirator 10 opens from the folded position as described above, the stiffening panel 40 opens out about lateral crease line B-B. As the respirator approaches the open configuration (as shown in FIGS. 4 to 6) the fold along lateral crease line B-B flattens out and the stiffening panel curves about a longitudinal crease indicated at line C-C. The curving of the panel 40 along longitudinal crease line C-C prevents the folding about lateral crease line B-B which gives the stiffening panel 40 and thereby lower panel 20 additional rigidity. This additional rigidity is at least in part imparted by the stiffening sheet 40 folding about longitudinal crease line C-C as the respirator 10 opens from a concave external angle to a convex external angle, that is to say a mountain fold is formed when the fold goes overcentre about the longitudinal crease line C-C. This in turn helps to prevent the collapse of the lower panel 20 and thus improves the conformity of the lower panel 20 to the chin area of the face.

Once the respirator 10 is open, the user is able to position the open cup-shaped air chamber of the respirator over the face and position the headbands as shown in FIG. 9 in order to don the respirator.

Figure 10:
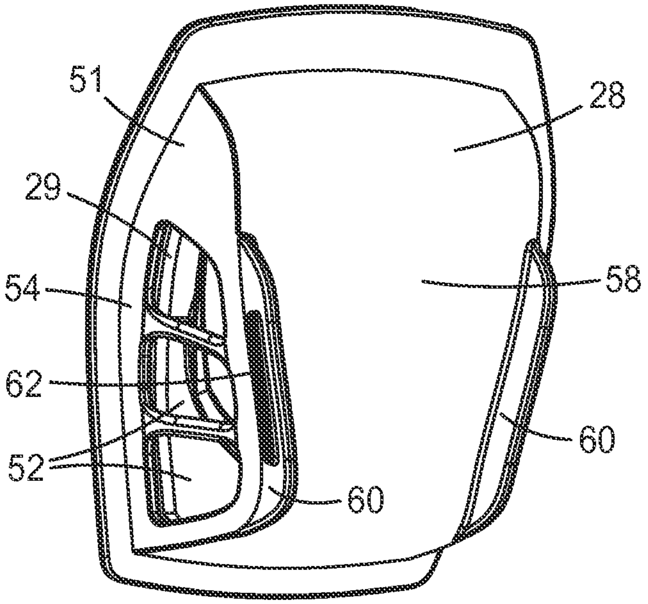
FIG. 10 is a detailed front perspective view of the valve of the personal respiratory protection device of FIG. 1.

In order to more readily don and doff the respirator 10, the respirator is provided with a valve 28 with grip portions 29 which are shown in greater detail in FIG. 10. The valve 28 is adhered to the central portion using an adhesive such as that commercially available under the trade designation 3M™ Scotch-Weld™ Hot Melt Spray Adhesive 61113M™. The valve 28 has side walls 51 which include apertures 52 to allow the exhaled air to pass through the valve 28. The side walls 51 have a curved form with an inwardly extending mid-portion and outwardly extending base 54 and upper section 56. Arranged on a top surface 58 of the valve 28 are upwardly extending ridges 60 which carry outwardly extending ribs 62.

The curved side walls 51 act as a grip region 29 since the curves match the curvature of the fingers of the user. The performance of the grip region is improved by the provision of the ridges 60 which extends the grip region. Performance is further improved by the provision of the ribs 62 which make the grip region 29 easier to grip and hold. The curved side walls 51, ridges 60 ribs 62 individually and collectively form an indicia to the user that the grip region 29 is to be gripped in order to open and don the respirator as described above.

FIG. 10 shows an alternative embodiment of valve 28' which differs from valve 28 in that it has taller ridges 60'. It is conceivable within the scope of the invention that other forms of grip region could act as indicia to the user, for example a textured or colored surface to the side walls 50, ridges 60 and/or ribs 62.

It will be appreciated that whilst such a grippable valve 28, 28' is described with reference to a three panel (central, upper and lower panel 20), flat-fold respirator 10, it will be appreciated that the valve 28, 28' could be equally applied to other respirators including cup respirators.

Figure 11:
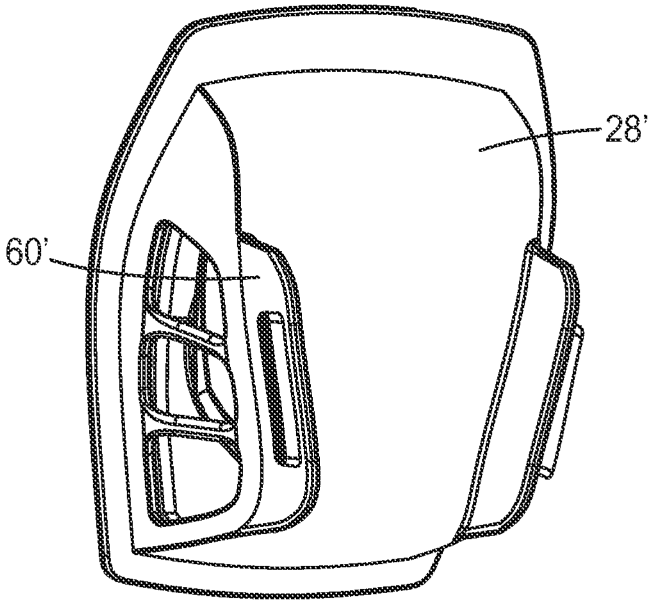
FIG. 11 is a detailed front perspective view of an alternative embodiment of the valve of the personal respiratory protection device of FIG. 1.
Figure 12:
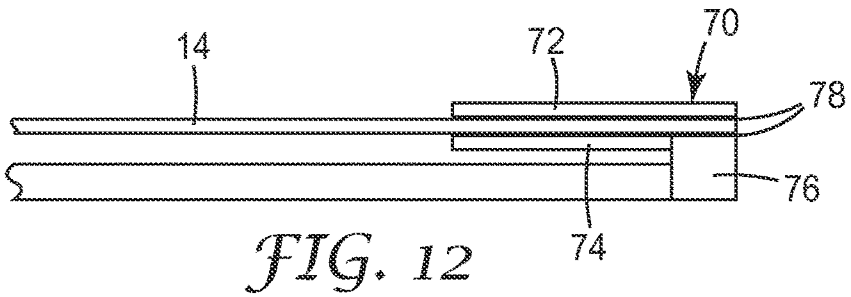
FIG. 12 is a detailed cross-sectional view of part of the personal respiratory protection device of FIG. 1 taken along line XI-XI in FIG. 2 and showing attachment of the headband to the main body with the device in its flat-fold configuration.
Figure 13:
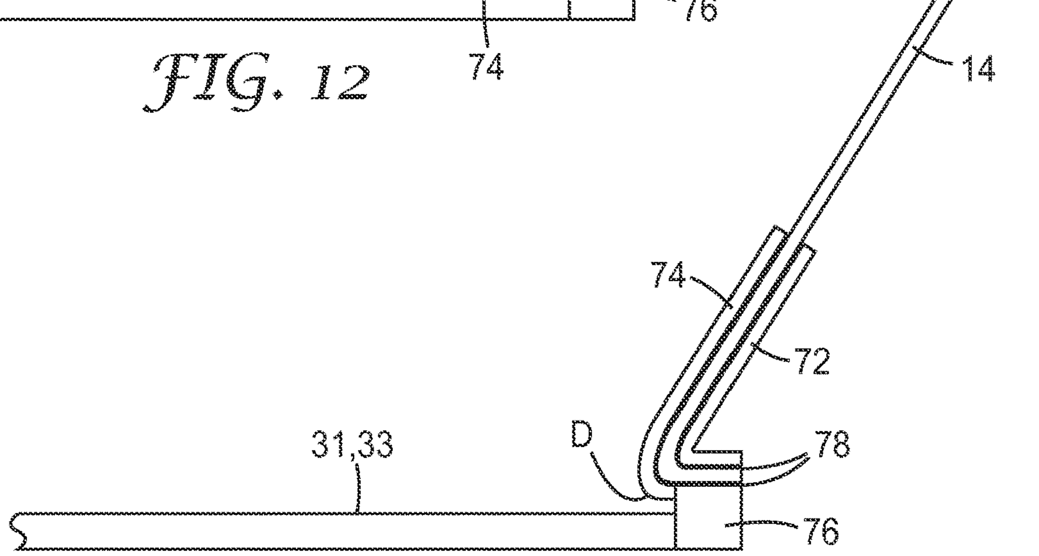
FIG. 13 is a detailed cross-sectional view of part of the personal respiratory protection device of FIG. 1 taken similar to FIG. 12 and showing attachment of the headband to the main body with the device in its open configuration.

Turning now to FIGS. 11 and 12, the attachment of the headband 14 to the headband attachment lug 31, 33 is shown in greater detail. The headband 14 is attached to the main body 12 by a head band module indicated generally at 70. The module 70 has a headband 14 which is bonded on its upper side to an upper tab 72 and on its lower side to a lower tab 74. The tabs 72, 74 are formed of a non-woven material used to form the filter material described above. The non-woven material tabs 72, 74 are bonded to the headband 14 using a known adhesive 78 such as that commercially available under the trade designation 3M™ Scotch-Weld™ Hot Melt Spray Adhesive 6111.

The module 70 is then ultrasonically welded to the lug 31, 33 to form a weld 76 between the lower tab 74 and the main body 12.

In FIG. 11 the head band module is shown with the respirator in its folded position. As the respirator 10 is opened the headband becomes stretched and pulls outwardly on the lugs 31, 33.

In FIG. 12 the head band module is shown with the respirator in its open position. The stretching of the headband 14 causes the module 70 to curve which leads to the lower tab 74 being held in tension. This causes a high load to act at the point of intersection D of the lower tab 74 and the lug 31, 33. However, the weld 76 is relatively strong in peel mode (that is to say the extreme tension load applied to the edge of the weld at point D by the stretching of the headband). This provides an improvement over prior art attachment techniques which place an adhesive bond in peel mode rather than a weld which is far stronger in peel than an adhesive.

Figure 14:
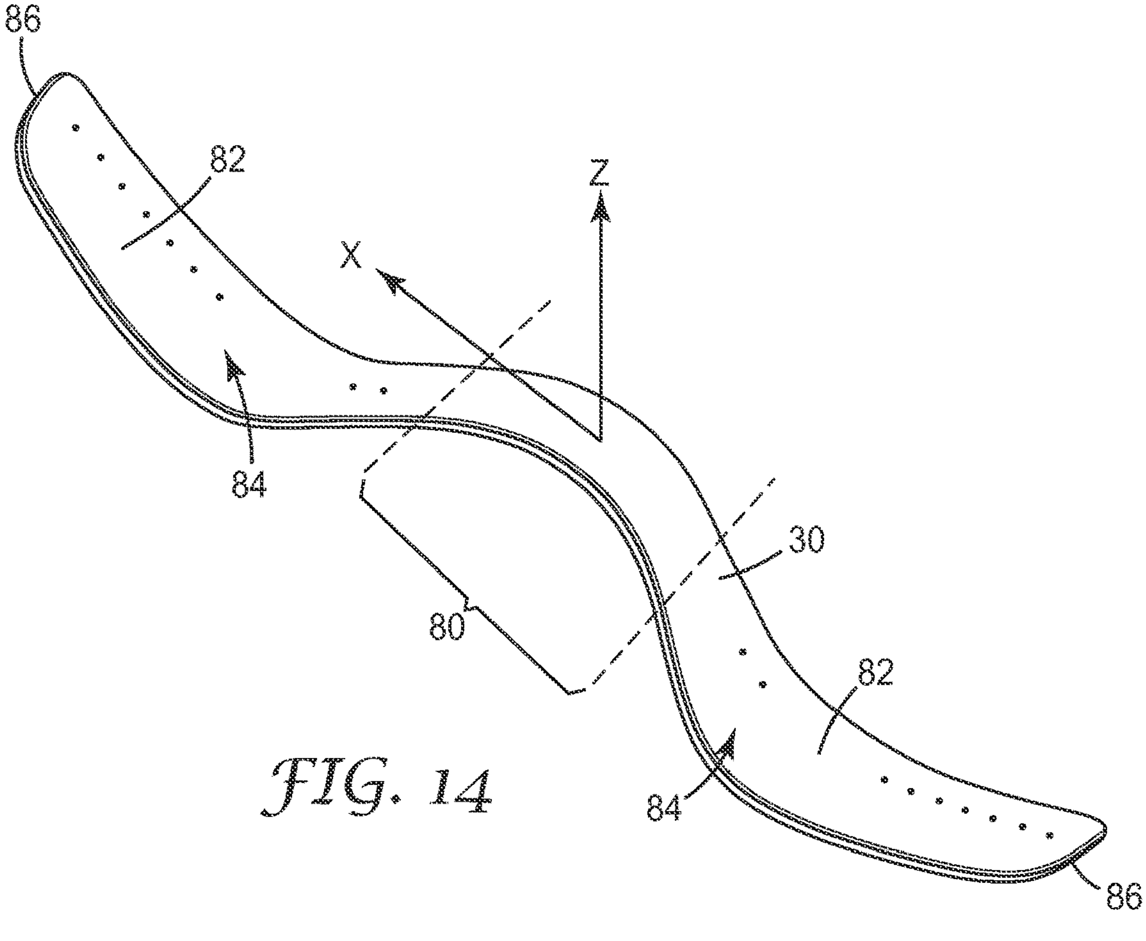
FIG. 14 is a detailed front perspective view of the nosepiece of the personal respiratory protection device of FIG. 1.

Turning now to FIG. 14, the nosepiece 30 is shown in greater detail to have a resiliently flexible central portion 80 and first and second rigid outer portions 82 extending outwardly from the central portion 80. The central portion 80 is substantially flat when the respirator is in the flat fold configuration. The central portion 80 is approximately 20 mm wide and 8 mm deep. Each of the outer portions 80 has a wing which defines a concave elliptical bowl having an outwardly extending major axis X and upwardly extending minor axis Z. Each elliptical bowl has a nadir indicated generally at 84 and positioned approximately equidistant between a centerline of the nosepiece 30 and an outer edge 86 of the wings, the nadir being positioned 26 mm from the centerline of the nosepiece 30. The elliptical bowl gives the outer portions 82 rigidity whilst the flat central portion 80 is able to flex under load. This allows the central portion 80 to flex over the bridge of the nose of the user whilst the rigidity of the outer portions 82 and the varying point of contact offered by the curved profile of the rigid portions offers a close fit between the respirator and the cheek of the user. These features of the nosepiece 30 therefore improve the fit and comfort of the respirator 10 over prior art respirators.

The nosepiece 30 is formed using a known vacuum casting technique using a polymeric material such as polyethylene. Such a material gives the required flexibility in the central portion 80 whilst having sufficient strength to give the outer portions 82 the required rigidity. Such a material also allows the nosepiece to return to its flat position which allows the respirator 10 to be removed and placed in the pocket of the user without the requirement to flatten the nosepiece.

It will be appreciated that certain features described herein could be used in isolation or in conjunction for the benefit of the invention. For example, it is envisaged that any one or more of the following features could be advantageously combined with the current invention:

Grippable valve 28
Stiffening panel 40
Headband attachment module 70
Nosepiece 30

The invention claimed is:

1. A personal respiratory protection device comprising:
an upper panel,
a central panel,
a lower panel,
a respirator external surface, and
a respirator internal surface,
the central panel being separated from each of the upper and lower panels by an upper bond and a lower bond, respectively, such that the personal respiratory protection device is capable of being folded flat for storage along the first and second bond and opened to form a cup-shaped air chamber over a nose and mouth of a wearer when in use, wherein:
the central panel comprises a curvilinear lower peripheral edge that is coexistent with the lower bond between the central panel and the lower panel such that the curvilinear lower peripheral edge comprises an axis of rotation between the lower panel and the central panel, and
the lower panel comprises a lower outer periphery;
wherein the lower panel has a graspable tab attached to an interior portion of a lower panel external surface at a point of attachment whereby the graspable tab is attached inwardly of the lower outer periphery and the lower bond such that the point of attachment is closer to the axis of rotation than if the graspable tab were positioned on the lower outer periphery of the lower panel, wherein the graspable tab faces away from the nose and mouth of the wearer on the respirator external surface when the personal respiratory protection device is on a face of the wearer,
wherein attachment of the graspable tab on the interior portion of the lower panel external surface enables the graspable tab to be graspable in use without making contact with the respirator internal surface and to apply an opening force to the interior portion to pivot the lower panel about the axis of rotation of the lower peripheral edge of the central panel and to cause a middle portion of the lower panel to open wide to form an air chamber which closely matches the face of the wearer.

2. The personal respiratory protection device of claim 1 wherein the lower panel is folded to form a lateral fold at a position equidistant between the lower bond and the lower outer periphery of the lower panel, wherein the point of attachment of the graspable tab is positioned within 10 mm above or below the lateral fold.

3. The personal respiratory protection device of claim 2, wherein the point of attachment of the graspable tab is positioned on the lateral fold.

4. The personal respiratory protection device of claim 1 further comprising a resiliently compliant headband secured to the central panel.

5. The personal respiratory protection device of claim 4 wherein the resiliently compliant headband is positioned forward of the graspable tab towards the central panel when the personal respiratory protection device is folded.

6. The personal respiratory protection device of claim 1 further comprising an exhalation valve that is disposed on the central panel.

7. The personal respiratory protection device of claim 6 wherein the exhalation valve has a grip region which is grippable by the wearer, the grip region being configured to indicate to the wearer that the exhalation valve is to be gripped during opening and donning of the personal respiratory protection device.

8. The personal respiratory protection device of claim 1 wherein the graspable tab is positioned on a longitudinal centerline of the personal respiratory protection device.

9. The personal respiratory protection device of claim 1 wherein at least a portion of the graspable tab is visible to the wearer when the personal respiratory protection device is folded.

10. The personal respiratory protection device of claim 1 wherein the personal respiratory protection device has a multi-layered structure that comprises a first inner cover web, a filtration layer that comprises a web that contains electrically-charged microfibers, and a second outer cover web, the first and second cover webs being disposed on first and second opposing sides of the filtration layer, respectively, wherein a nose conforming element is attached to the second cover web.

* * * * *